Patented Apr. 11, 1950

2,503,866

UNITED STATES PATENT OFFICE 2,503,866

PREPARATION OF A STABILIZED CREAM PRODUCT

Lewis H. Chrysler and Emory F. Almy, Columbus, Ohio, assignors to M & R Dietetic Laboratories, Inc., a corporation of Ohio No Drawing. Application November 2, 1946, Serial No. 707,530. In Canada April 12, 1946

27 Claims. (Cl. 99—54)

This invention relates to heat and acid stable milk products such as skim milk, whole milk and cream in liquid or dry form, and to the methods of making the same. In its more limited aspect it relates to a cereal, whipping or coffee cream, particularly the latter, having a protein content of greatly increased stability to heat and/or acids, and to the method of making the same. The invention will be described with particular reference to dried cream and to the method of making the same, for illustrative purposes, but it is to be understood that it is applicable to the preparation of other milk products mentioned herein.

This application is a continuation-in-part of our prior copending application, Serial No. 599,514, filed June 14, 1945, now abandoned.

The treated dried creams of the present invention are stable and can be reconstituted readily to produce stable products. Either the dried cream product or the reconstituted product may be used to cream hot coffee without forming a heavy scum or "feather" on the surface. These cream products are characterized by having a low concentration of salts and a protein content stable to heat and/or acids such as are encountered in hot coffee, strawberries, blackberries and the like, and in the manufacture of alimentary products such as creamed tomato soup, "process cheeses," mayonnaise, salad dressings, caramels, etc. Because of the low salt content our creams do not dampen the coffee bouquet and flavor, as is the case with reconstituted dried creams prepared in accordance with prior art methods.

A characteristic of the dried cream products of the present invention is that they can be reconstituted in such relatively concentrated proportions as to possess whipping properties. Additionally, they can be reconstituted in more dilute proportions to give a rich tasting cereal cream or a rich cereal milk of about 8 to 10% butterfat content.

It is known that dried cream and reconstituted dried cream as ordinarily prepared are not stable in brewed coffee at the temperatures at which it is commonly served. Upon the addition of these prior art cream products to hot coffee the cream "breaks" with the result that a part of it precipitates to the bottom of the cup, some remains in suspension and some forms a heavy scum or "feather" on the surface which is mingled with a considerable amount of freed butterfat or oil. Apart from the resulting unappetizing appearance, the coffee is only slightly whitened or creamed.

If the cream is homogenized prior to drying in accordance with prior art methods the tendency of the reconstituted cream to oil-off is reduced, but the stability of the protein content of the cream in hot coffee is not improved and may actually be reduced by such treatment.

Stabilization of cream protein can be accomplished by converting the casein to a soluble caseinate, usually a sodium caseinate, but the chemicals used in accomplishing this remain in the finished dried cream in the forms of salts which dampen the coffee bouquet and flavor. While some of these offending salts may be eliminated by treating the milk products before drying with base exchange materials, others are added in doing so because the pH of the milk product to be treated with base exchange material must first be adjusted with sodium hydroxide, and after treatment with hydrochloric acid, citric acid or other acids to restore the pH of the milk product. The overall effect of this base exchange treatment of milk solids, including the subsequent acid pH adjustment step, is to build up the salt content of the final product and, consequently, to make more pronounced the flavor dampening effect thereof when used in hot coffee.

In accordance with the present invention skim milk, whole milk or cream is subjected to a succession of treatments with ion-exchange materials to reduce the salt content and at the same time stabilize the milk protein to heat, thereby making possible the production of a dried cream product which can be added directly to hot brewed coffee or which can be reconstituted and then added to the hot coffee without affecting the flavor or bouquet of the coffee and without "breaking" or "feathering." In this process alkalinity and acidity are preferably developed in the milk product solely by ion-exchange materials, and in no instance is the milk product subjected to such conditions of acidity as to effect coagulation of the lactalbumin, as is the case with the prior art methods. In consequence, the treated milk products of our invention retain the readily dispersible lactalbumin as an added nutrient in the finished product.

We are not prepared to state the precise reasons for the stability of our cream products in hot coffee, but it appears that this stability is largely due to the presence in the cream of a milk solids not fat content having a markedly lower calcium content than normal milk solids not fat and, in particular, a markedly lower calcium (as Ca) to phosphorus (as P) ratio in the milk solids not fat, which reduction in calcium and in the calcium to phosphorus ratio is brought about by the treatment of the milk solids not fat with ion exchange materials. In general, the conditions for stability in hot coffee of the dried cream product of the present invention are more critical than for the reconstituted product. Thus, the dried cream product is stable on being added to hot brewed coffee when the calcium content of the milk solids not fat content of the cream is approximately 20 to 45% of the normal calcium content of milk solids not fat and the calcium to phosphorus ratio is in a range of from about 0.25 to about 0.55, preferably from about 0.35 to about 0.5. The reconstituted product (about 20% total solids, for example) is stable in hot coffee when the calcium content of the milk solids not fat is approximately 20 to 70% of normal and the calcium to phosphorus ratio is in a range of from about 0.25 to about 0.90.

As will be seen below, the normal calcium to phosphorus ratio of milk solids not fat is substantially in excess of about 1.2.

In the preparation of treated milk products in accordance with the present invention, particularly dried cream, it is preferred to treat milk solids not fat in the form of skim milk and to supply the required butterfat in the form of high-testing cream, or butter or butter oil at a later stage in the process prior to the drying step, for in the passage of whole milk or cream, particularly the latter, through the ion-exchanger beds some butterfat is retained in the beds, from which it cannot be readily removed. Accordingly, the present invention will be illustrated by the treatment of skim milk to make a dried cream, but it is to be understood that the milk product subjected to treatment may be whole milk or cream.

In carrying out the present invention, modified milk or milk solids are produced by cation exchange of pasteurized skim milk of a pH of about 6.5 to 6.9 acting in the sodium cycle. The exchange material employed may be of the resin type such as are described, for example, in Industrial and Engineering Chemistry, 1941, vol. 33, pages 697 et seq. and known as Amberlite resins; or of the carbonaceous or sulfonated carbonaceous type, or in some cases of the mineral or zeolitic type. Typical cation exchangers which may be employed are for example, the commercial cation exchange materials such as Amberlite IR-100, ZeoKarb, Catex and the like. Exchange materials of the mineral or zeolitic type, for use in carrying out the present invention, require special activation or regeneration procedures to increase their effectiveness in cation removal relative to anion removal.

In this treatment a substantial proportion, approximately 20 to 60 to 70% and sometimes even more, of the calcium present in the skim milk is replaced by sodium with the formation of a sodium caseinate in the skim milk. The sodium caseinate, which is carried over into the final dried product, makes the product readily dispersible in water and hence easily re-constituted, and more stable to the action of heat and acid such as are encountered in the case of hot coffee, for example. The skim milk during this treatment becomes slightly alkaline, usually having a pH in the order of about 7.50 to 8.0 or somewhat higher.

In the use of such cation exchangers as referred to above, regeneration is suitably effected by means of sodium chloride solution after prior treatment with alkali such as soda ash or sodium hydroxide, a wetting agent being preferably employed as set forth in the U. S. patent to Hull, No. 2,346,844, granted April 18, 1944, where the exchange material has previously been used in the treatment of whole milk. Instead of regenerating with sodium chloride solution, the regeneration may be effected with a dilute solution of hydrochloric acid followed by a solution containing sodium chloride and a small proportion of sodium hydroxide. After regeneration, or, if fresh, after an initial treatment with the sodium chloride solution, the exchange material is washed with water until the sodium chloride content of the effluent is reduced preferably to not more than 30 grains per gallon, at which time the exchange material may be used for the treatment of the skim milk or like milk product used as the source of the modified milk solids. If desired, the skim milk may be slightly acidified to increase the effectiveness of the calcium removal.

The cation exchange treatment is so conducted as to reduce the ratio of calcium to phosphorus in the milk solids not fat of the treated skim milk so that when it is blended with the desired amount of high butterfat cream, butter or butter oil, the blend will have the reduced calcium to phosphorus ratio referred to above. The reduction is accompanied by an increase in pH, varying from about 7.0 to 7.25 as the lower limit to about 9.5 to 10.0 or even somewhat higher as the upper. The reduction is primarily in the calcium, the phosphorus being removed to a substantially less extent, only about 4 to 5%, in contradistinction to the prior known treatments of milk fluids with mineral base exchangers in which both calcium and phosphorus are removed to a substantial extent to reduce the curd tension of the milk.

Where the increase in pH is such that the pH of the treated skim milk is in the order of about 7.5 to 8.0 and higher, it may be desirable to reduce this pH to a point within the range commonly found in fresh whole or skim milk, say from about 6.5 to 6.90. This may be effected by the addition of a suitable acid, such as hydrochloric acid, acetic acid, citric acid, or the like, or preferably by the use of cation exchange materials of the types previously referred to, acting, however, in the hydrogen or acid cycle. Thus the exchange material employed, for example, Amberlite IR-100, is contacted with a dilute hydrochloric acid solution for a considerable period of time, say 30 minutes, the acid solution removed and the free acid washed out. This acid exchange material may then be agitated in suitable proportions with the treated milk to reduce the pH of the latter to the desired point. In this way the reduction of the pH of the treated milk may be effected without increasing its salt content, as would be the case if acid were employed for the purpose. Also, small additional amounts of calcium are usually removed by this treatment.

Where the pH of the treated milk or skim milk is not excessive; say for example where it does not exceed about 7.5 to 8.0 or thereabout, it is not necessary to apply to it the treatment with the acid exchange material to reduce its pH, and it, or the solids derived from it, may be employed directly in the present process.

The substantially neutral skim milk from the bed of cation-exchange material operating in the hydrogen-cycle may be used in that form or it may be dried and used in making alimentary products as described herein. In making dried cream, however, it is condensed to a total solids content of about 30 to 50%, the condensation being effected under vacuum or at atmospheric pressure, as desired. The calculated amount of butter, butter oil or high butterfat fresh cream, say 35 to 55% cream, to get the desired fat content in the finished cream powder, is added to the treated skim milk either prior to or subsequent to the condensation, as desired. Also if desired, part of the fat may be added to the treated skim milk before condensation and the balance afterwards. The resulting mixture is heated to about 145° F. to 170° F. for about 15 to 20 minutes, then homogenized and finally dried, either by a spray or drum drying apparatus, for example. The resulting product is a powder containing the desired butterfat content, say a butterfat content of about 35 to 75%. The spray-drying procedure is preferred since it results in a fine porous powder which requires no grinding, and caramelization is avoided, but a drum dryer can be utilized with satisfactory results. The resulting dry cream powder is suitable for use as such or in a reconstituted form. If desired, the dried cream product may be vacuum-packed or packed in an inert gas for storage or transportation.

The final dried product, when used either in that state or in a reliquefied state, possesses remarkable whitening or creaming properties. For example, a 20% total solids solution of the cream powder in water will cream at least twice as much coffee as ordinary 27% total solids coffee cream and gives a full, rich cream flavor when added to hot or cold cereals. By increasing the reliquefied total solids slightly, say to about 30 to 35%, the cream can also be whipped producing a product of an unusually high yield and fine flavor.

In general, for the treatment of the milk, which may be whole or skim milk, either raw or pasteurized, it is found that 1.25 to 1.50 cubic feet of the exchange material to each 12 to 14 inches depth of bed for each 30 gallons of milk to be processed is sufficient when a pH of about 8 is secured on the treated milk. More of the fluid milk may be treated with the same amount of exchange material, but the relative percentage of calcium removal on the total treated product will be lower and the pH will move toward the acid side. A suitable rate of flow through the bed of exchange material is three minutes per gallon. Ordinarily a small amount of the wash water remains in the exchange material and this causes a slight dilution of the treated milk.

After the exchange material has been prepared, the milk is passed through it at the rate above mentioned and in general, a calcium to phosphorus ratio of the treated milk of about 0.15 to 0.75 is secured. By using a larger proportion of exchange material based on the milk treated or by slightly acidifying the milk prior to treatment, suitably with hydrochloric acid, lactic acid or citric acid, or by various combinations thereof, a higher relative proportion of the calcium may be removed; or alternatively, if the same over all proportion of calcium removal is desired, a larger amount of milk may be treated per cubic foot of exchange material. Thus by preliminarily acidifying the milk before treatment with the exchange material, say to a pH of about 6.10 or lower, a larger amount of milk, ranging from about 20 to about 45% greater, may be treated, per cubic foot of exchange material, securing very closely the same calcium to phosphorus ratio in the treated product. In carrying out the present invention the treatment with the exchange material is controlled to secure in the solids of the treated whole or skim milk a calcium to phosphorus ratio of from about 0.15 to 0.75 and preferably from 0.25 to 0.6.

In a typical operation, using 1.36 cubic feet of the resinous cation exchange material Amberlite IR-100 per 14 inch depth of bed to about each 50 gallons of milk treated, the fresh whole milk treated had a total solids content of 12.66%, a pH of 6.72 and a calcium to phosphorus ratio of 1.155. After treatment, the treated product had a total solids content of 10.22%, a pH of 7.43 and a calcium to phosphorus ratio of 0.547.

In another case, using a similar exchange material, the fresh whole milk had a pH of 6.67 and a calcium to phosphorus ratio of 1.137. In this case the fresh milk was treated with citric acid to bring its acidity to 0.24% (calculated as lactic acid) and its pH to 6.08. It was then passed through the cation exchange material, the conditions being similar to those of the preceding example, except that in this case approximately 73 gallons of the milk were treated per 1.36 cubic feet of the exchange material. The pH of the product was 7.92 and the calcium to phosphorus ratio was 0.429.

If desired, the pH of the treated milk may be reduced after the treatment with the cation exchange material, for example, by agitation with cation exchange materials such as those previously described, in the hydrogen cycle. The exchange material may be placed in the hydrogen cycle by simple agitation with dilute acid, for example, dilute hydrochloric acid, and washing out the free acid.

As is readily apparent, by varying the relative proportion of the milk or skim milk treated per unit volume of the exchange material, the calcium (as Ca) to phosphorus (as P) ratio in the final product may be varied as desired.

In revivifying the exchange material after having been contacted with the whole milk or skim milk, it may suitably be washed first with warm water; then with a solution made alkaline with soda ash and containing a wetting agent, such as those referred to in the patent to Hull, above referred to, and then again washed with warm water. It may then be regenerated as heretofore described.

Where the milk under treatment has been skim milk, the wash with alkali solution containing a wetting agent may be dispensed with. A suitable method of revivifying in such case is first to wash the exchange material with water; then with dilute hydrochloric acid in solution and again with water until the wash water no longer has an acid taste. It is then revivified by passing a slightly alkaline salt solution through the bed of exchange material, a suitable solution being one containing 0.5 pound of sodium chloride and .013 pound of sodium hydroxide per gallon. The bed of exchange material is then washed until the sodium chloride content of the effluent is reduced to not over 30 grains per gallon, as pointed out above.

The following examples are illustrative of our invention. In these examples the flow of skim milk through the ion exchanger beds was at the rate of 1/3 gallon per minute per 1.36 cu. ft. of bed, unless otherwise indicated.

*Example 1*

In preparing the cationic exchanger bed, Amberlite IR-100, for operation residual milk left in the bed from a previous run was washed out by passing water upflow through the bed. This was then followed by passing downflow through the bed 40 gallons of water containing 800 ml. of concentrated hydrochloric acid. The bed was then washed with water upflow until the effluent water was no longer acid to the taste. After draining off the wash water 70 gallons of 5% sodium chloride solution containing 500 grams of sodium hydroxide were passed downflow through the bed in order to convert the exchanger to the sodium cycle. The bed was then washed downflow with water in the usual manner and was then ready for operation.

Pasteurized skim milk was then passed downflow through the regenerated cationic exchanger until 30 gals. of treated skim milk effluent were obtained. The composite pH of this effluent was 9.01. After holding for one hour the pH of the effluent was adjusted to 6.80 by rapidly stirring in the requisite quantity of IR-100 acting in the hydrogen cycle.

To 180 lbs. of the treated skim milk were added 43 lbs. of fluid cream testing 43.5% butterfat. The mixture was forewarmed at 170° F. and held at that temperature for 20 minutes, 15 minutes being required to bring the mixture to the temperature of 170° F. The mixture then was condensed in a small evaporating pan until a condensing strike of 6.4° Bé. at 130° F. was obtained. The yield was approximately 76 lbs. of condensed product. The condensed product was then homogenized at 2000 lbs. pressure, the temperature of homogenization being approximately 130° F. and the product was spray dried.

The dried product had an excellent texture and was not greasy to the feel when rubbed between the thumb and forefinger of the hand. Approximately 28 lbs. of dried cream were obtained from the dryer. The following table shows the analytical data of the treated skim milk and of the dried cream made therefrom:

|  | pH | Percent T. S. | Percent Fat | Percent Ash | Percent Ca | Percent P | Ca : P | Percent Ca removed |
|---|---|---|---|---|---|---|---|---|
| Orig. skim | 6.72 | 9.24 |  | .749 | .1222 | .1017 | 1.202 |  |
| Treated skim | 9.01 | 8.73 |  | .622 | .0379 | .0967 | 0.392 | 67 |
| Powder | 6.80 | ¹ 1.32 | 50.87 | 3.608 | .2414 | .5174 | 0.467 | 61 |

¹ This is the moisture content of the dried product.

Tests of the reconstituted cream (20% total solids) and of the dried cream in hot coffee showed that this batch of cream was soluble, did not break or coagulate and did not produce feathering.

*Example 2*

The cleaning and regenerating of the cationic exchanger bed was carried out in the same manner as described in Example 1 with the exception that 475 grams, instead of 500 grams, of sodium hydroxide were added to the 5% sodium chloride regenerating solution.

Pasteurized skim milk having a pH of 6.72 was passed through the bed until 30 gals. of skim milk effluent having a composite pH of 8.92 were obtained. After holding the treated skim milk for one hour the pH was reduced to 6.79 by rapidly stirring in slightly over 8 quarts of IR-100 acting in the hydrogen cycle.

180 lbs. of the adjusted treated skim milk were mixed with 43 lbs. of fluid cream testing 43.53% butterfat. The mixture was forewarmed at 170° F. for 20 minutes, 7 minutes being required to bring the temperature to 170° F. It was then condensed in the small vacuum pan to a condensing strike of 6.0 Bé. at 130° F. 80 lbs. of the condensed product were obtained which was then homogenized at 2000 lbs. pressure and a temperature at 130° F. The homogenized product was then spray dried and a yield of 29 lbs. of dried cream was obtained.

The data in the following table show the analytical characteristics of the treated skim milk and of the dried cream made therefrom:

|  | pH | Percent T. S. | Percent Fat | Percent Ash | Percent Ca | Percent P | Ca : P | Percent Ca removed |
|---|---|---|---|---|---|---|---|---|
| Orig. skim | 6.72 | 9.43 |  | .774 | .1247 | .1037 | 1.203 |  |
| Treated skim | 8.92 | 8.53 |  | .601 | .0374 | .0976 | 0.383 | 65 |
| Powder | 6.79 | ¹ 1.35 | 51.19 | 3.473 | .2512 | .5094 | 0.493 | 59 |

¹ This is the moisture content of the dried product.

The hot coffee test showed that this cream readily dissolved and was stable toward coagulation and feathering when added to hot coffee (temperature 180° F.) in both the reconstituted form (20% total solids) and in the dry form.

*Example 3*

The bed was prepared for operation in the same manner as described in Example 1 with the exception that only 350 grams of sodium hydroxide was added to the 5% sodium chloride solution instead of the 475 grams used previously.

Pasteurized skim milk having a pH of 6.68 was passed through the exchanger bed until 30 gals. of treated skim milk effluent having a pH of 8.09 were obtained. After holding the treated skim milk for one hour the pH was readjusted to 6.75 by rapidly stirring in 7.5 quarts of IR-100 acting in the hydrogen cycle.

To 180 lbs. of the treated skim milk was added 42 lbs. of fluid cream testing 44.3% butterfat. The mixture was then forewarmed, condensed, homogenized and dried in a manner similar to that described in Example 1. Approximately 29 lbs. of dried cream were taken from the dryer.

The following table shows the analytical characteristics of the treat skim milk and of the dried cream made therefrom:

|  | pH | Percent T. S. | Percent Fat | Percent Ash | Percent Ca | Percent P | Ca : P | Percent Ca removed |
|---|---|---|---|---|---|---|---|---|
| Orig. skim | 6.68 | 9.24 |  | .753 | .1377 | .1051 | 1.310 |  |
| Treated skim | 8.09 | 8.82 |  | .638 | .0436 | .0981 | 0.444 | 66 |
| Powder | 6.75 | ¹ 1.42 | 49.52 | 3.626 | .2704 | .5330 | 0.507 | 61 |

¹ This is the moisture content of the dried product.

The reconstituted cream was quite soluble and perfectly stable in hot coffee showing no evidences of protein coagulation, feathering or "oiling off" of the fat. This was also true when the cream in the dry form was added to hot coffee at 180° F. temperature.

*Example 4*

The cleaning and regenerating of the cationic exchanger bed was carried out in the same manner as described in Example 1 with the exception that 80 gals. of a 5% sodium chloride regenerating solution free from alkali was used.

Pasteurized skim milk having a pH of approximately 6.7 was passed through the bed until 30 gals. of skim milk effluent having a composite pH of 7.83 were obtained. This batch of milk was adjusted to a pH of 10.0 by the addition of 80 ml. of 50% sodium hydroxide solution. After holding one hour, the pH was readjusted to 6.70 by stirring in rapidly a quantity of IR-100 acting in the hydrogen cycle.

To 180 lbs. of the filtered treated skim milk, 46 lbs. of fluid cream containing 40% butterfat was added and the whole was forewarmed, condensed, homogenized, and spray dried as described in Example 1. Approximately 27 lbs. of cream powder was obtained having the following analytical characteristics.

as the lower limit, because we have found that the stability of the treated skim milk solids to heat and acid becomes reduced as the pH of the anion effluent approaches this lower limit. The treated skim milk solids are almost uniformly stable to heat and acid when the anion effluent is maintained between a pH of about 9.0 to 10.5. Below these limits, to a pH of about 8.5, occasional instability of the treated skim milk solids results. Below a pH of about 8.5 the treated skim milk solids are usually unstable to heat and acid.

The alkaline skim milk is now contacted with a cation exchange material operating in the hydrogen cycle until the pH thereof is brought back to about 6.5 to 6.8. One of the above-mentioned cation exchange materials which operate in the hydrogen cycle may be used to restore the pH of the cation exchange treated and anion exchange treated skim milk. This material may be in the form of a bed through which the treated milk is passed, or the material may be mixed with the treated milk in a suitable tank. During this acidification treatment of the skim milk excess sodium ions, in an amount sufficient to render the skim milk practically neutral, are removed. Small additional amounts of calcium are also usually removed during this treatment.

|  | pH | Percent T. S. | Percent Fat | Percent Ash | Percent Ca | Percent P | Ca : P | Percent Ca removed |
|---|---|---|---|---|---|---|---|---|
| Orig. skim | 6.7 | 9.24 |  | .766 | .1319 | .1060 | 1.244 |  |
| Treated skim | 10.00 | 8.18 |  | .620 | .0368 | .1013 | 0.363 | 71 |
| Powder | 6.70 | ¹1.23 | 51.38 | 3.667 | .2641 | .5212 | 0.507 | 59 |

¹ This is the moisture content of the dried product.

The coffee test showed that the reconstituted cream (20% total solids) and the dry cream were both quite soluble and stable in hot coffee with no pronounced feathering being evident.

In some instances, where there is in the skim milk a large proportion of acid ions present as salts, namely, potential acid-forming ions present in combination with cations as salts, particularly phosphates and citrates, it may be desirable to follow the initial cation exchange treatment of the skim milk with a treatment with an anion exchange material to remove the excess of such ions. The removal of acid ions of these salts is particularly advantageous because the presence of these salts in skim milk is largely responsible for the dampening of the coffee aroma and flavor.

Common anion exchange materials of this type are those known to the trade as DeAcidite, Anex, Amberlite IR-4, etc.

During the treatment of the cation-exchange treated skim milk with the anion exchange material the skim milk becomes alkaline, the pH thereof usually varying over a wide range, from about 10.5 downwardly. If the skim milk is passed through a bed of anion exchange material, either downflow or upflow, as is the usual practice in the treatment of milk products with such material, the initial skim milk effluent has a pH in the order of about 10.5 or somewhat higher. As the activity of the bed to exchange ions diminishes on continued passage of the skim milk therethrough the pH of the skim milk effluent progressively decreases down to about 8.25 to 8.5 and below. We prefer to discontinue the contact of the skim milk with the anion exchange material when the pH of the skim milk passing from the bed is in the order of about 8.5, preferably 9.0, The following is an example of the process of our invention for making a batch of powdered coffee cream, using the additional anion exchange treatment to remove acid ions.

*Example 5*

2100 lbs. (250 gals.) of cold, pasteurized skim milk having a pH of 6.78 were passed downflow through a 6 cu. ft. bed of freshly revived cation exchange material operating in the sodium cycle (ZeoKarb) at a flow rate of 10 gals. per 6 minutes. A fixed milk level was maintained on the bed and the cation exchange treated milk was pumped from the bottom discharge of the bed to the top of a 3 cu. ft. bed of anion exchange material (DeAcidite) and passed through the bed at the same flow rate. The treated milk discharging from the bottom of the anion exchange bed was passed into a holding tank.

The above two beds delivered approximately 60 gals. total of bed water before the milk put in its appearance at the anion exchange bed discharge and at that point the valve was switched sending the treated milk to the holding tank. Since the beds were wet with rinse bed water at the start of the operation, a dilution of the milk passing through the beds took place, resulting in an increase of approximately 30 gals. over the original 250 gals.

The milk discharging from the cation exchange bed had a pH of 7.62. The pH of the milk discharging from the anion exchange bed at the beginning of discharge, using the first 10 gals. for testing pH, had a pH of 10.44. The next 10-gal. batch had a pH of 10.43, the next 10.33, the next 10.18 and the pH of the succeeding portions of the milk tapered off generally, and the final 10-gal. batch had a pH of 8.87.

During the passage of the milk through the beds a portion of the lactose content of the milk was retained by the beds. Of the 104 lbs. of lactose in the original skim milk 12 lbs. were retained by the beds.

The 280 gals. of the diluted treated skim milk in the holding tank were agitated and approximately 14 gals. of wet cation exchange material operating in the hydrogen cycle (Amberlite IR-100) were slowly added. Agitation was continued until the pH of the milk was reduced to 6.70–6.85. As soon as this pH adjustment was made, the agitation was stopped and the ion exchange material was permitted to settle to the bottom of the tank after which the pH-adjusted milk was drawn off through a filter or clarifier and pumped to the forewarming wells where it was heated to 170° F., held 20 minutes and then drawn into the condenser and condensed to a 40–45% total solids content at a condensing temperature of 135° F.

The condensed material was then transferred to a tank and a sample was taken from which the per cent of total solids was determined. This was found to be 176 lbs. in the illustrative example. 191 lbs. of butter-fat in the form of 50% cream were added to the condensed treated skim milk and the mixture was well mixed and then run through a homogenizer at 2000 p. s. i. and 145° F. From the homogenizer the cream was passed into a holding tank from which it was pumped to the spray drier and spray-dried, resulting in 382 lbs. of finished cream powder containing 50% butterfat.

The untreated solids not fat which are carried along with the cream into the condensed treated skim milk, in this as well as in the previous examples, have no effect on the stability of the proteins of the finished dried product. Where the pH of the effluent from the anion exchange bed is 9 and higher, substantial proportions of untreated milk solids not fat may be added to the effluent from the final ion exchange treatment without affecting the stability of the protein in the final product to heat and acid. As the pH of the effluent from the anion exchange bed is up around the upper limit of about 10.5, larger amounts of untreated milk solids not fat can be added to the effluent from the final ion exchange treatment without affecting the stability of the final product to heat and acid.

The following tabulated data is submitted to show the effects of the ion exchange treatments on the skim milk and to compare the product composition of dried cream produced in accordance with the present invention with dried cream produced commercially in accordance with prior art methods. The data submitted is on five samples of skim milk which came from the same original batch as did the cream used in all of the five samples. The skim milk of the above illustrative example also came from the same original batch of milk.

Sample:
- Control—All untreated skim. No treated skim.
- 1 —No untreated skim. All treated skim.
- 2 —15% untreated skim. 85% treated skim.
- 3 —30% untreated skim. 70% treated skim.
- 4 —45% untreated skim. 55% treated skim.

*Analytical data on the fluids, previous to condensing*

| Sample | Percent Lactose | Per cent Ca. | Per cent Ca removed | Per cent P | Per cent P removed | Per cent Protein | pH |
|---|---|---|---|---|---|---|---|
| Orig. Skim—after pH adjust | 4.97 | 0.1185 | --- | 0.1556 | --- | 3.35 | 6.78 |
| 1 | 3.81 | 0.0675 | 43.1 | 0.109 | 30.5 | 3.02 | 6.90 |
| 2 | 4.11 | 0.0750 | 36.6 | 0.107 | 31.4 | 3.06 | 6.80 |
| 3 | 4.21 | 0.0830 | 30.2 | 0.112 | 27.9 | 3.13 | 6.85 |
| 4 | 4.44 | 0.0930 | 21.8 | 0.116 | 25.8 | 3.19 | 6.89 |

The samples were condensed to a total solids content varying progressively from 36% to 42.8%. The cream mixing, homogenizing and drying procedures were identical on all of the five samples and followed the procedure of the illustrative example. The analytical results on the finished powders and on commercial dried cream are as follows:

| Sample | Per Cent Moisture | Per Cent Ash | Per Cent Fat | Per Cent Protein | Per Cent Lactose | Per Cent Ca | Per Cent P | Per Cent Cl | Per Cent Na | Per Cent K |
|---|---|---|---|---|---|---|---|---|---|---|
| Control | 0.63 | 4.18 | 47.04 | 18.76 | 27.80 | 0.654 | 0.5713 | 0.412 | 0.217 | 0.640 |
| 1 | 1.02 | 3.56 | 50.31 | 19.46 | 24.45 | 0.365 | 0.5469 | 0.399 | 0.791 | 0.006 |
| 2 | 0.73 | 3.55 | 51.37 | 18.76 | 24.15 | 0.368 | 0.5315 | 0.401 | 0.730 | 0.101 |
| 3 | 0.81 | 3.74 | 49.84 | 18.95 | 24.85 | 0.446 | 0.5508 | 0.445 | 0.648 | 0.188 |
| 4 | 0.96 | 3.75 | 49.98 | 18.66 | 25.15 | 0.498 | 0.5466 | 0.428 | 0.530 | 0.324 |
| Comm'l dried cream | 0.56 to 0.80 | 2.43 to 4.16 | 50.00 to 71.00 | 11.00 to 19.00 | 14.70 to 25.50 | See Control Sample | | | | |

The five samples were reconstituted in cold water at a 20% total solids content and each given the hot (190° F.) coffee test. The control cream "broke" and precipitated instantly. Samples 1 and 2 were stable and showed no "feathering." A perceptible "feathered" film developed on the surface of the coffee containing sample 3, but this "feathering" was no worse than that developed in coffee to which fresh 20% cream was added. Sample 4 produced a slightly heavier "feathered" film than sample 3, but there was no typical "breaking" and precipitation as in the control sample.

The calcium to phosphorus ratio of the cream of sample 1 was 0.67; that of sample 2 was 0.69; that of sample 3 was 0.81; and that of sample 4 was 0.91.

The dried creams produced in accordance with the present invention, when packaged as described above, have excellent keeping properties and can be shipped to all parts of the world without spoiling. The shelf life of the dried creams of the present invention is actually longer than the shelf life of whole milk powder. The reconstituted liquid cream has exceptional keeping properties, bacteriologically, and is capable of withstanding much longer exposures to room temperatures than can fresh cream. The salt balance of the product has been so altered as to render it stable to heat and acid not only in hot coffee but in soups, salad dressings and other similar commercially prepared products where curdling will take place if fresh cream is added. In the dried cream product of the present invention the fat globules of the added butterfat are coated with the sodium caseinate produced by the hereinabove described demineralization process and this coating makes possible the production of a liquid cream possessing much greater stability and ability to color coffee than is possible with a calcium caseinate as in fresh cream, and this increased ability to color coffee carries through into the dried cream so successfully that the powder itself can be added directly to hot or boiling coffee without disturbing its coffee-coloring properties or its stability. In contrast to the dried creams of the present invention, dried fresh cream prepared in accordance with prior art methods, whether homogenized or not, "breaks" or curdles when added to hot coffee.

In addition to the foregoing, the creams of the present invention retain most of the lactose and albumin which are lost in the acid curd process of making sodium caseinate. While it is conceivable that butterfat globules can be coated with a sodium caseinate which is produced by treating casein with sodium hydroxide and the resulting alkalinity of the product reduced to a pH of about 6.8 by adding hydrochloric, citric, phosphoric or like acid, such a product is not the product of the present invention, for there is such a high increase in the salt content thereof as to make it practically useless for the purposes heretofore mentioned.

In the examples given, whole milk may be used instead of the skim milk specifically referred to, the proportion of cream employed being modified so that the final product has approximately the same fat content.

It is to be understood that the process described herein is not to be limited to the manufacture of a powdered cereal, whipping or coffee cream, for it can also be used to produce whole milk or skim milk powder or fluid which is particularly adapted for use in any processed food where the stability of the milk used is endangered by the temperature and/or acidity of the materials to which it may be added. For example, liquid or dried whole milk, skim milk or cream can be used without fear of "breaking" or curdling in the making of high acid soups such as creamed tomato soup, for example, or in candy manufacture, particularly in overcoming the destabilization that takes place in ordinary milk solids in caramel cooking or in the manufacture of "process cheeses," or in the prevention of clotting or "breaking" of various types of emulsions such as are encountered in the manufacture of mayonnaise, salad dressings and oleomargarine.

The present invention is not to be construed as limited to the details of the illustrative examples, for many variations in proportions, procedures and other details may be made without departing from the scope of the invention as set forth in the appended claims. Thus, for example, the treated skim milk, prior to condensation, may be mixed with the required amount of high butterfat content cream and the mixture then forewarmed, condensed, homogenized and dried as described above. This procedure makes it possible to give the cream the same forewarming treatment as the skim milk, thus destroying deleterious enzymes as well as removing any undesirable volatile odors and flavors which are conducive to poor keeping qualities of the final products. If desired, the condensed, homogenized mixture of treated skim milk and cream may be canned or otherwise packaged while it is in the liquid state, either with preliminary or subsequent sterilization, and the product used, as desired, in liquid form, either with or without dilution. Other variations will suggest themselves from the foregoing.

We claim:

1. A process for producing a milk material comprising treating a fluid milk product having a substantially normal calcium and phosphorus content and a pH of about 6.5–6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, and treating the resulting product with a cation exchange material operating in the hydrogen cycle until the pH of the original milk product is substantially restored.

2. A process for producing dry cream comprising treating skim milk and like milk products having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, and treating the resulting product with a cation exchange material operating in the hydrogen cycle until the pH of the original milk product is substantially restored, condensing the treated product, adding an amount of butterfat or butterfat-containing material to the condensed treated product sufficient to give the desired fat content in the dried cream but not to increase the calcium to phosphorus ratio beyond the range of about 0.25 to 0.90, homogenizing the mixture and drying it.

3. A process for producing a dry cream comprising treating skim milk and like milk products having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, condensing the treated product, adding an amount of butterfat or butterfat-containing material to the condensed treated product sufficient to give the desired fat content in the dried cream but not to increase the calcium to phosphorus ratio beyond the range of about 0.25 to 0.90, homogenizing the mixture and drying it.

4. A process for producing a milk material comprising treating a fluid milk product having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, treating the resulting product with an anion exchange material to remove acid ions present as salts and then with a cation exchange material operating in the hydrogen cycle until the pH of the original milk product is substantially restored.

5. A process for producing a milk material comprising treating a fluid milk product having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, treating the resulting product with an anion exchange material to remove acid ions present as salts and then with a cation exchange material operating in the hydrogen cycle until the pH of the original milk product is substantially restored, and drying the treated product.

6. The process for producing a milk material set forth in claim 5 wherein the treatment with anion exchange material is continued until the pH of the product is further raised to about 8.5 to 10.5.

7. The process for producing a milk material set forth in claim 5 wherein the treatment with anion exchange material is continued until the pH of the product is further raised to about 9.0 to 10.5.

8. A process for producing a milk material comprising treating a fluid milk product having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, treating the resulting product with an anion exchange material to remove acid ions until the pH of the product is further raised to about 9.0 to 10.5, and then with a cation exchange material operating in the hydrogen cycle until the pH of the original product is substantially restored, and spray drying the treated product.

9. A process for producing dry cream comprising treating skim milk having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, treating the resulting product with an anion exchange material to remove acid ions present as salts and then with a cation exchange material operating in the hydrogen cycle until the pH of the original milk product is substantially restored, condensing the treated product, adding an amount of cream to the condensed treated product sufficient to give the desired fat content in the dried cream, but not to increase the calcium to phosphorus ratio beyond the range of about 0.25 to 0.90, homogenizing the mixture and drying it.

10. A process for producing dry cream comprising treating skim milk having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.14 to 0.75, thereby raising the pH of the product, treating the resulting product with an anion exchange material to remove acid ions present as salts and then with a cation exchange material operating in the hydrogen cycle until the pH of the original milk product is substantially restored, adding an amount of cream to the treated product sufficient to give the desired fat content in the dried cream, but not to increase the calcium to phosphorus ratio beyond the range of about 0.25 to 0.90, and, successively, condensing, homogenizing and drying the mixture.

11. The process of producing dried cream set forth in claim 9 wherein the treatment with anion exchange material is continued until the pH of the product is further raised to about 8.5 to 10.5.

12. The process of producing dried cream set forth in claim 9 wherein the treatment with anion exchange material is continued until the pH of the product is further raised to about 9.0 to 10.5.

13. The process of producing dried cream set forth in claim 10 wherein the treatment with anion exchange material is continued until the pH of the product is further raised to about 9.0 to 10.5.

14. A process for producing dry cream comprising treating skim milk having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, treating the resulting product with an anion exchange material to remove acid ions present as salts and then with a cation exchange material operating in the hydrogen cycle until the pH of the original milk product is substantially restored, adding a relatively small amount of untreated skim milk to the treated skim milk, condensing the mixture, adding an amount of cream to the condensed mixture sufficient to give the desired fat content in the dried cream, but not to increase the calcium to phosphorus ratio beyond the range of about 0.25 to 0.90, homogenizing the mixture and drying it.

15. A process for producing a cream product comprising treating skim milk and like milk products having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, condensing the treated product, adding an amount of butterfat or butterfat-containing material to the condensed treated product sufficient to give the desired fat content in the cream, but not to increase the calcium to phosphorus ratio beyond the range of about 0.25 to 0.90, and homogenizing the mixture.

16. A process for producing a cream product comprising treating skim milk and like milk products having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, and treating the resulting product with a cation exchange material operating in the hydrogen cycle until the pH of the original milk product is substantialy restored, condensing the treated product, adding an amount of butterfat or butterfat-containing material to the condensed treated product sufficient to give the desired fat content in the cream, but not to increase the calcium to phosphorus ratio beyond the range of about 0.25 to 0.90, and homogenizing the mixture.

17. A process for producing dry cream comprising treating skim milk and like milk products having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, and treating the resulting product with a cation exchange material operating in the hydrogen cycle until the pH of the original milk product is substantially restored, adding an amount of butterfat or butterfat-containing material to the treated product sufficient to give the desired fat content in the dried cream, but not to increase the calcium to phosphorus ratio beyond the range of about 0.25 to 0.90, condensing and homogenizing the mixture and drying it.

18. A process for producing a dry cream comprising treating skim milk and like milk products having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, adding an amount of butterfat or butterfat-containing material to the treated product sufficent to give the desired fat content in the dried cream, but not to increase the calcium to phosphorus ratio beyond the range of about 0.25 to 0.90, condensing and homogenizing the mixture and drying it.

19. A process for producing a cream product comprising treating skim milk and like milk products having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, adding an amount of butterfat or butterfat-containing material to the treated product sufficient to give the desired fat content in the cream, but not to increase the calcium to phosphorus ratio beyond the range of about 0.25 to 0.90, and condensing and homogenizing the mixture.

20. A process for producing a cream product comprising treating skim milk and like milk products having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, and treating the resulting product with a cation exchange material operating in the hydrogen cycle until the pH of the original milk product is substantially restored, adding an amount of butterfat or butterfat-containing material to the treated product sufficient to give the desired fat content in the cream, but not to increase the calcium to phosphorus ratio beyond the range of about 0.25 to 0.90, and condensing and homogenizing the mixture.

21. A process for producing a milk material comprising treating a fluid milk product having a substantially normal calcium and phosphorus content and a pH of about 6.5 to 6.8 with a cation exchange material operating in the sodium cycle, until the calcium content of the product is approximately 20 to 70% of normal and there is secured in the product a calcium to phosphorus ratio of about 0.15 to 0.75, thereby raising the pH of the product, and treating the resulting product with a cation exchange material operating in the hydrogen cycle until the pH of the original milk product is substantially restored, and drying the treated product.

22. A dry cream product comprising a homogeneous mixture of butterfat and cation-exchanged milk solids not fat having a content of calcium approximately 20 to 70% of normal and having a calcium to phosphorus ratio ranging from about 0.25 to 0.90.

23. A dry cream product comprising a homogeneous mixture of butterfat and cation-exchanged milk solids not fat having a content of calcium approximately 20 to 45% of normal and having a calcium to phosphorus ratio ranging from about 0.25 to 0.55.

24. A cream product comprising a homogeneous mixture of butterfat and condensed fluid, cation-exchanged milk solids not fat having a content of calcium approximately 20 to 70% of normal and having a calcium to phosphorus ratio ranging from about 0.25 to 0.90.

25. A cream product comprising a homogeneous mixture of butterfat and condensed fluid, cation-exchanged milk solids not fat having a content of calcium approximately 20 to 45% of normal and having a calcium to phosphorus ratio ranging from about 0.25 to 0.55.

26. A dry cream product comprising a homogeneous mixture of butterfat and milk solids not fat having a content of calcium approximately 20 to 70% of normal and having a calcium to phosphorus ratio ranging from about 0.25 to 0.90.

27. A dry cream product comprising a homogeneous mixture of butterfat and milk solids not fat having a content of calcium approximately 20 to 45% of normal and having a calcium to phosphorus ratio ranging from about 0.25 to 0.55.

LEWIS H. CHRYSLER.
EMORY F. ALMY.

REFERENCES CITED

The following references are of record in the file of this patent:

UNITED STATES PATENTS

| Number | Name | Date |
|---|---|---|
| 1,511,808 | Grindrod | Oct. 14, 1924 |
| 2,045,097 | Otting | June 23, 1936 |
| 2,072,903 | Otting et al. | Mar. 9, 1937 |
| 2,102,642 | Otting et al. | Dec. 21, 1937 |
| 2,346,844 | Hull | Apr. 18, 1944 |

FOREIGN PATENTS

| Number | Country | Date |
|---|---|---|
| 542,846 | Great Britain | Jan. 29, 1942 |

OTHER REFERENCES

"Readjustment of salts in milk by base exchange treatment," published Ind. and Eng. Chemistry, Nov. 1933, pp. 1297–1298.

Journal of Dairy Science, vol. XXX; No. 10, October 1947, pages 737 to 746.

Certificate of Correction

April 11, 1950

Patent No. 2,503,866

LEWIS H. CHRYSLER ET AL.

It is hereby certified that errors appear in the printed specification of the above numbered patent requiring correction as follows:

Column 7, line 42, for "driyer" read *dryer*; column 8, line 13, for "6.0" read *6.0°*; line 16, for "temperature at" read *temperature of*; line 65, for "treat" read *treated*; column 9, line 45, for "particullarly" read *particularly*; column 15, line 71, for "0.14" read *0.15*; column 17, line 36, for "sufficent" read *sufficient*;

and that the said Letters Patent should be read with these corrections therein that the same may conform to the record of the case in the Patent Office.

Signed and sealed this 18th day of July, A. D. 1950.

[SEAL]

JOE E. DANIELS,
*Assistant Commissioner of Patents.*